United States Patent [19]

Evans et al.

[11] 4,399,665
[45] Aug. 23, 1983

[54] AIRCRAFT AIR CONDITIONING SYSTEM

[76] Inventors: Hugh G. Evans, W. 214 6th Ave.; Stephen Speer, S. 358 Couer d'Alene Apt. #6; James S. Christy, E. 10918 26th, all of Spokane, Wash. 99204; Stanley S. Lafrenz, P.O. Box 1356, Sandpoint, Id. 83864

[21] Appl. No.: 327,813

[22] Filed: Dec. 7, 1981

[51] Int. Cl.³ .............................................. B60M 3/04
[52] U.S. Cl. ........................................ 62/239; 62/244
[58] Field of Search .......................... 62/239, 241, 244

[56] References Cited

U.S. PATENT DOCUMENTS 2,540,991 2/1951 Price ................................. 62/241 X
4,209,993 7/1980 Rannenberg ..................... 62/239 X Primary Examiner—Lloyd L. King
Attorney, Agent, or Firm—Barry G. Magidoff

[57] ABSTRACT

An air conditioning system for powered aircraft is provided wherein a refrigerant compressor is located immediately adjacent to the alternator at the right forward portion of a horizontally opposed aircraft engine. The compressor is mechanically driven indirectly from the main bulkhead/starter ring gear assembly through a twin sheaved pulley on the alternator. The air conditioning system also is provided with two sets of inlet ports for cooling air flow to a refrigerant condenser. One set of inlet ports accepts ram air when the aircraft is airborne. The second set of ports is closable and accepts air when an interior intake impeller is activated. The engine-compressor-alternator combination fits within an aerodynamic cowling having no greater frontal area than one required for the engine without the compressor.

13 Claims, 11 Drawing Figures

AIRCRAFT AIR CONDITIONING SYSTEM

This invention relates to an improved aircraft air conditioning system, and more specifically to a system wherein the spatial requirements, overall energy used and external drag are reduced.

With the advent of newer, more high performance aircraft, capable of greater sustained flight, the provision of air conditioning systems, as well as heating systems, on a modern aircraft, has become more important to the general aviation industry. Up to the present time, the addition of suitable air conditioning systems into general aviation type aircraft often required either substantial modification of the engine compartment in order to accommodate a suitable refrigerant compressor or the driving of the compressor by less efficient, indirect means, such as electrical power provided indirectly from the engine or a battery. Further, the provision of an air conditioning system and a heating system, both of course being required for safe and comfortable flying, required two separate systems which also often resulted in a significant increase in overall drag on the airplane, especially at higher speeds.

In accordance with the present invention, a system for air conditioning an aircraft is provided, the aircraft comprising a horizontally opposed multicylinder internal combustion engine, an electrical generating means, such as a generator or alternator, the engine and electrical generating means being installed within an engine compartment on the aircraft; the air conditioning system comprising generally a compressor for refrigerant fluid, a condenser for the refrigerant fluid, and an evaporator for the refrigerant fluid, and fluid conduits interconnecting these elements. The improvement of the present invention provides for locating the refrigerant fluid compressor in a position adjacent the forward portion of the engine and below a horizontal cylinder, the alternator being driven by a pulley belt connected to the main propeller drive pulley, the compressor being driven by a pulley belt connected off the alternator pulley. Preferably, the pulley between the alternator and the compressor is an adjustable pulley to provide for tensioning of the pulley belt without removal of the pulley.

As a further improvement in accordance with this invention, an air conditioner system is provided that can operate on a relatively small general aviation aircraft while flying and while stationary on the ground. In accordance with this aspect of the invention, there is provided in addition to a forward facing ram inlet duct for the intake of coolant air while airborne, a closeable inlet is provided comprising a laterally facing orifice through the exterior of the aircraft and means for closing the orifice in response to changes in the fluid pressure differential across the orifice, and an air intake impeller means in fluid flow connection between the closeable orifice and the condenser. Preferably there is also provided means for automatically turning off the impeller when the plane becomes airborne thus further comprising the aircraft electrical power. As a further improvement, there is provided means for connecting the heater to the same air intake used for the condenser cooling air.

In the accompanying drawings, an example of an advantageous embodiment of the apparatus in accordance with the present invention is set forth. The apparatus is shown and described in schematic terms, often in an essentially symbolic manner, because of the conventional nature of the major portion of the apparatus. Appropriate structural details for actual operation when not explicitly set forth, are generally known and understood and need not be set forth in greater detail herein, as they are not part of the present invention. By eliminating the specific disclosure of such conventional apparatus, the scope and concept of the present invention becomes emphasized and clarified. Reference is made to coventionally available elements by both a generic description thereof and by a reference to a specific example, where possible, including a trade designation for a presently available device from a well known United States manufacturer. The details of the horizontally opposed aircraft engine and compressor, for example, are well known to the art and their detailed descriptions are thus readily available from other known sources.

The aircraft in which the invention herein is exemplified is a Piper Aerostar aircraft utilizing a Lycoming nominal 290 horsepower engine, Model IO-540 series, generally indicated by the numeral 10, shown as having two opposing banks of three cylinders each, a horizontally opposed engine having a total displacement of 541.5 cubic inches. The engine 10 shown is located in a nacelle 70 on the right wing of the aircraft. The Piper Aerostar is a high performance aircraft, where aerodynamic streamlining is especially significant. As a result the engine nacelles, or cowling, are carefully designed to provide minimum frontal area, and the engine and its auxiliary equipment are a relatively tight fit within the nacelles.

The compressor 12 is adjacent the right side of the engine; the model shown in the drawings herein is a conventionally available refrigerant compressor Model SD505 (manufactured by Sankyo International (U.S.A.) Inc., Dallas, Tex.). The compressor 12 is located forward of and beneath the right bank of cylinders (generally indicated by the numeral 13), and adjacent to but below the axis of the main starter ring gear bulkhead assembly, generally indicated by the numeral 14. As shown in the drawings, the two banks of cylinders are longitudinally offset, the left bank being located rearwardly of the right bank of cylinders. However, the oil cooler 200 is commonly placed on the left of the engine forward of the left cylinder bank.

The compressor 12 is located immediately adjacent the electrical generator means 16, in this case an alternator (e.g., an ALU-8428, manufactured by Prestolite, Toledo, Ohio.). The alternator 16 and compressor 12 are both suspended from the engine block at a location forward of the right bank of cylinders 13 and immediately behind and laterally of the starter ring gear 114. The starter motor 17 is located beneath and to the left of the starter ring gear 114.

Central to this invention is a compressor/alternator bracket mount 18 which provides for the direct structural support of the alternator 16, the compressor 12 and a tightener pulley 27 at the desired locations, all at the right forward portion of the engine.

The bracket mount 18 is connected to the engine block forward of and substantially on a level with the right hand bank of cylinders by bolts attached to a mounting pad formed at the forward end of the right engine case 21. The mounting pad is conventionally located at this location by the engine manufacturer for mounting the alternator. Extending from the forward portion of the bracket mount 18 laterally outwardly from the engine 10 is the tightener pulley bracket 22. An alternator bracket 23 extends downwardly below and, in this embodiment, slightly rearwardly of the pulley bracket 22. Located slightly to the rear of and above the alternator bracket mount 23, and extending laterally more outwardly is a compressor bracket 24.

The compressor 12 is suspended from the compressor bracket 24 and the alternator 16 from the alternator bracket 23. Extending forwardly from, and operatively connected to the alternator 16, is a double sheaved pulley assembly 26 having a forward groove 126 and a rearward groove 128. A tightener pulley 27 is rotatably connected to the forward surface of the pulley bracket 22; a compressor drive pulley 28 is operatively connected to and extends forwardly from the compressor 12. A main drive pulley 15 comprises a part of the bulkhead/starter ring gear assembly 14.

A main drive V-belt 30 rides on the main drive pulley 15, the tightener pulley 27 and the forward sheave 126 of the alternator pulley 26. A secondary compressor pulley V-belt 32 is connected between the compressor pulley 28 and the rearward sheave 226 of the alternator pulley 26.

Additional structural support is provided for the compressor 12 by a support strap 34, the upper end of which is connected to the rear of the tightener bracket 22.

The compressor 12 and the compressor pulley 28 are larger and bulkier than the alternator 16 and alternator pulley 26. Accordingly, the compressor and its pulley are located outboard of the alternator, but within the outer spatial envelope defined by the left-most edge of the right bank of cylinders 13 and the bottom of the engine 10. This provides a very compact combined package of the engine 10 and the compressor 12, which does not necessitate a major change in the aerodynamic profile, especially the frontal surface area, of the engine compartment nacelle 70, as compared to the engine 10 without a compressor.

The use of the double sheaved pulley 26 on the alternator 16 further reduces the overall size required for the drive of the compressor and alternator. This double sheaved alternator pulley 26 also allows use of the standard single sheave bulkhead/starter ring gear assembly 14. A dual sheave bulkhead assembly, with the alternator mounted on one side of the engine and the compressor mounted on the other, as has previously been done, does not provide as compact a system.

Figures 4, 10:
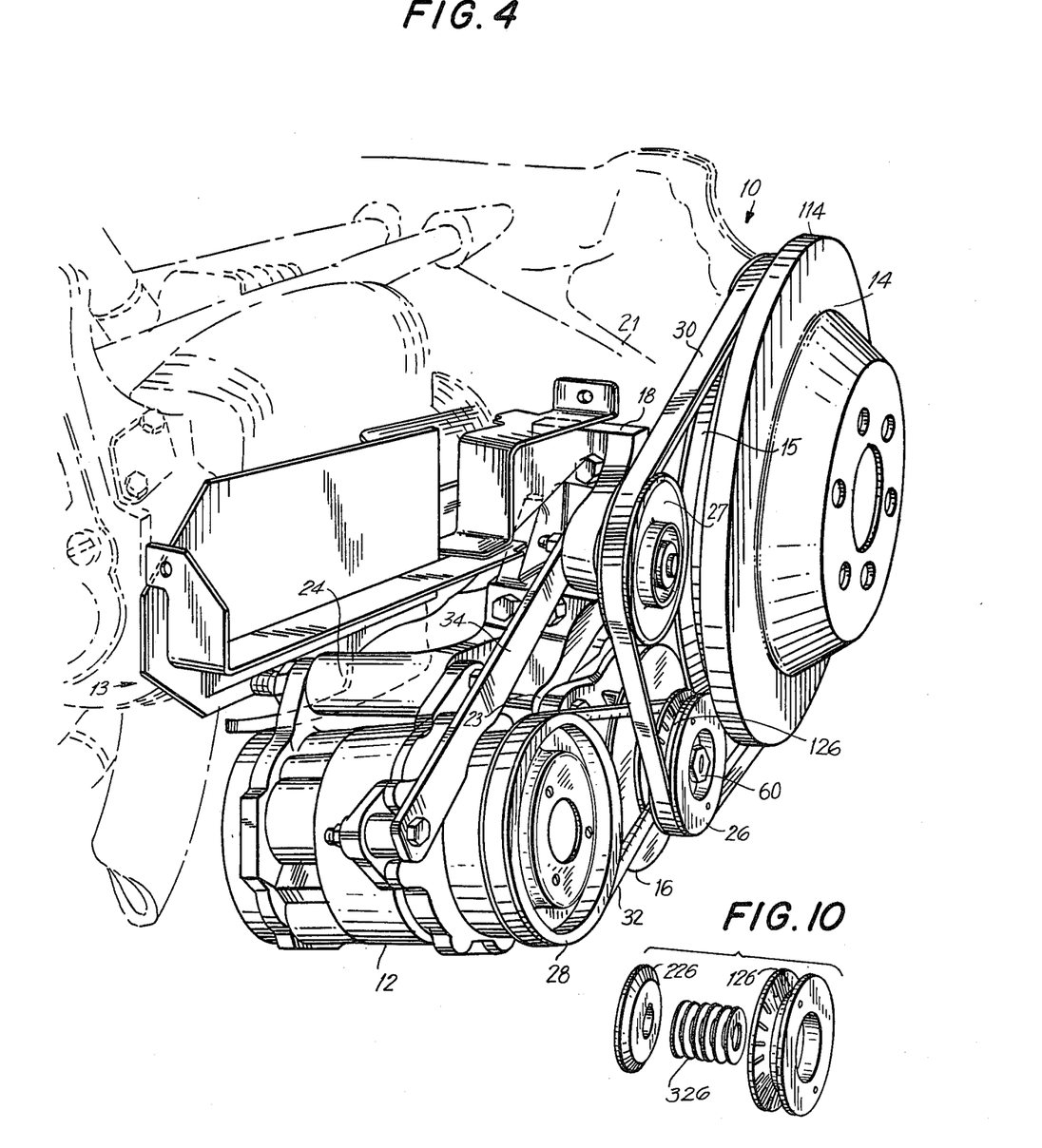
FIG. 4 is a perspective drawing of the right front of the engine of FIGS. 2 and 3.
FIG. 10 is a perspective drawing of a twin sheave alternator pulley.

The twin-sheave alternator pulley 26 shown in FIG. 10 is of a conventional adjustable type, wherein the pitch diameter of each sheave can be varied by adjusting the spacing between the sheave halves, thus providing the capability to tighten the pulley belt. The forward sheave 126 for the alternator drive belt is preferably grooved to provide friction for the additional power transfer required for the compressor.

Figure 6:
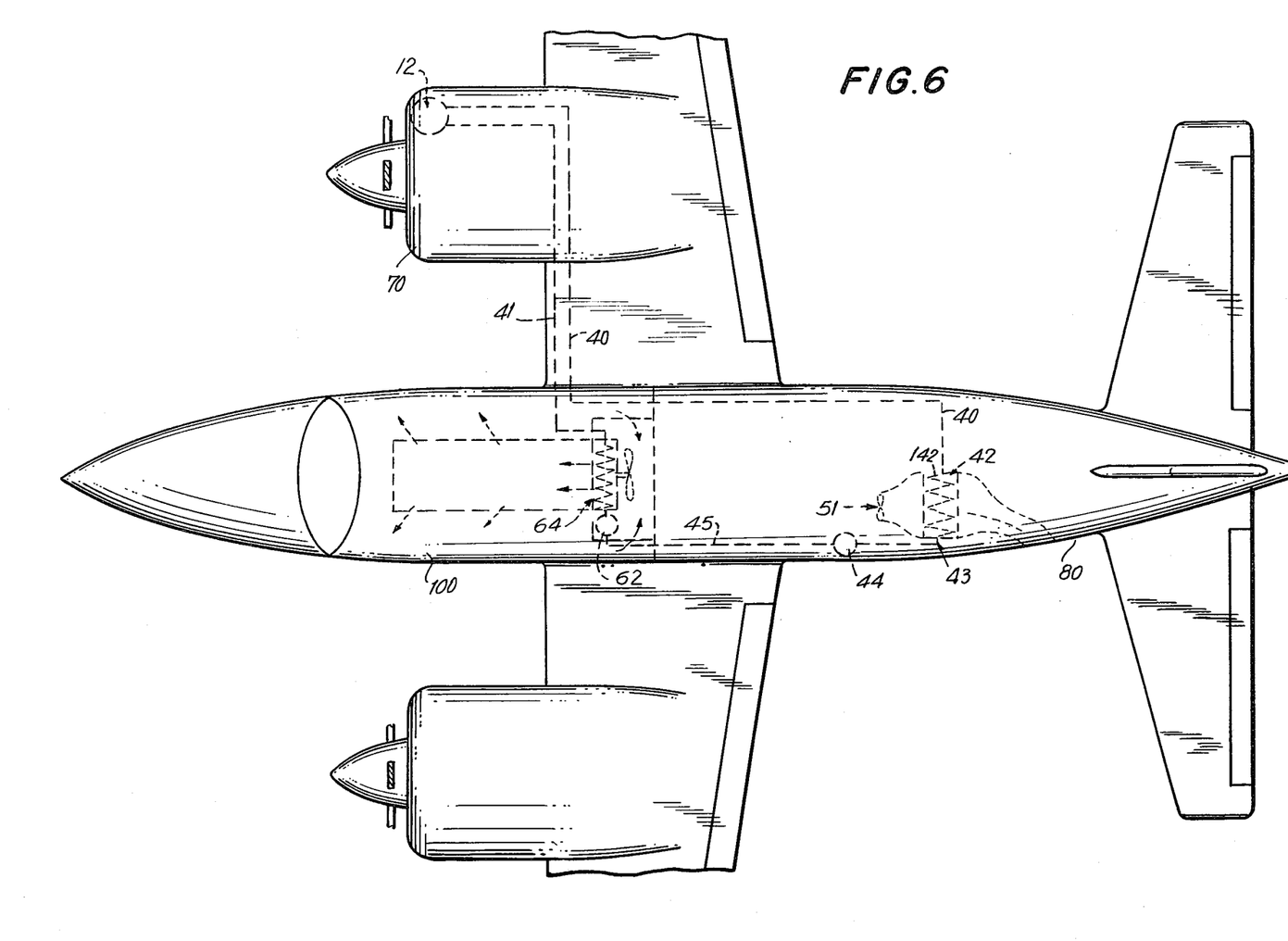
FIG. 6 is a partial top view of an Aerostar including a schematic diagram of the major operational portion and approximate component locations of the improved air conditioner system of this invention.

Referring to the overall air conditioning system Freon circuit, as shown at least in part in FIG. 6, a high pressure warm hose 40 extends from the high pressure outlet from the compressor 12 to a condenser 42 located in the aft fuselage. The condenser 42 is of a type conventionally used in aircraft air conditioning systems. The hose 40 is in fluid flow connection with a series of flow tubes 142 within the condenser 42, where heat is liberated to cooling air, the flow tubes 142 being connected at their second ends to one end of a high pressure hose 43. The hose 43, at its second end, is connected to a conventional refrigerant (Freon) dryer 44. The outlet from the dryer 44 is connected to one end of a high pressure hose (dried) 45 which at its other end connects to an expansion valve 62, which is in turn connected to a conventional refrigerant evaporator tube 64. The second end of the evaporator tube 64 is connected to the low pressure inlet of the compressor 12, via low pressure hose 41.

Figure 5:
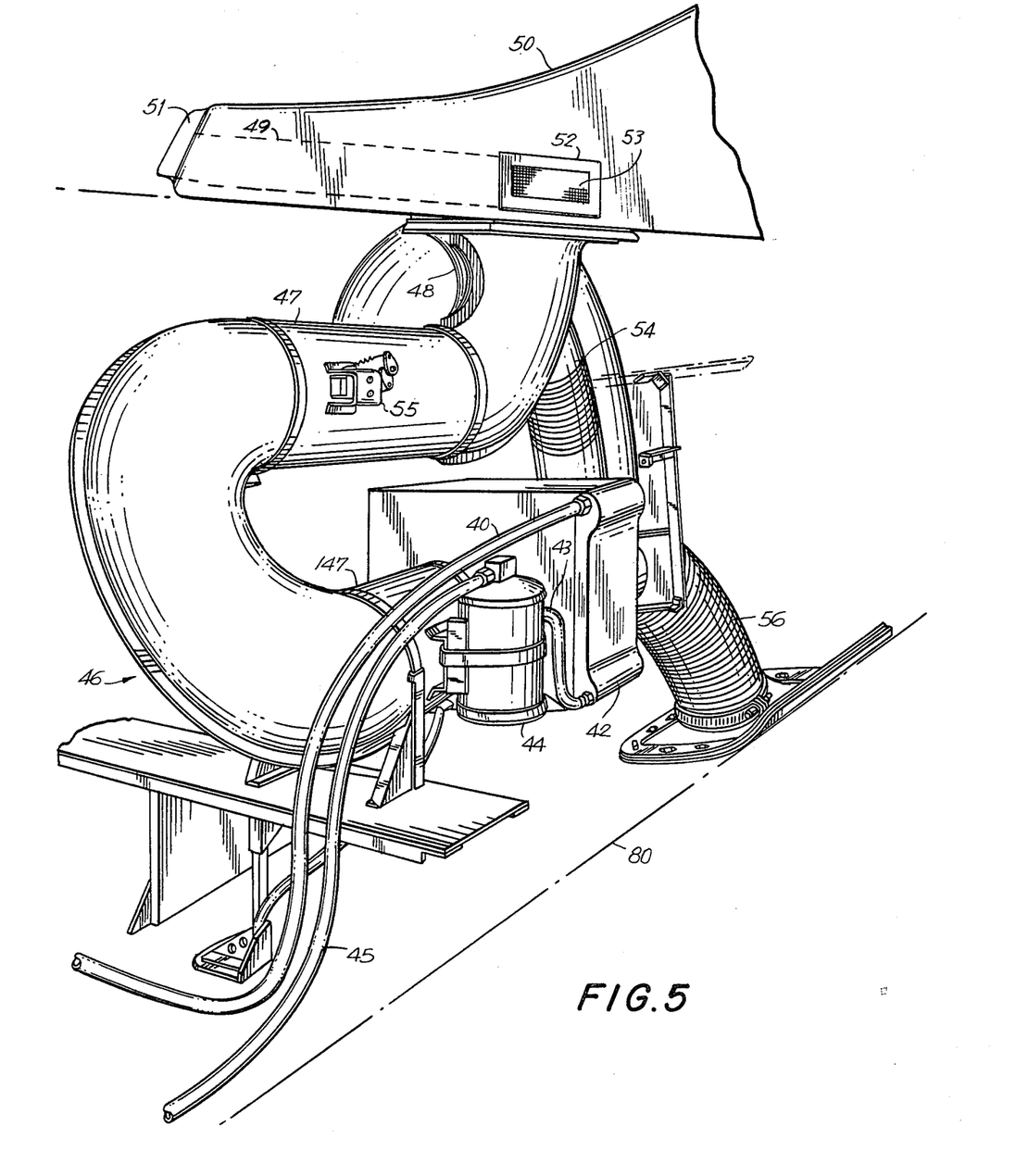
FIG. 5 is a schematic perspective view of a condenser cooling air flow system for improved air conditioning system in accordance with this invention.

For the Piper Aerostar the preferred cooling air flow path arrangement for the Freon condenser 42 is shown in FIG. 5. The cooling side plenum of the condenser 42 is connected to one end of an air duct, generally indicated by the numeral 46, including a 180° U-bend. The inlet end of the duct 46 is connected to a 90° curved, expanding inlet duct 48 which is connected at its upper, second end to an enclosed air channel defined by interior surfaces 49, within the forward portion of the aircraft's vertical dorsal fin 50. The air channel 49 is provided with three inlets opening to the atmosphere: a first ram inlet opening defined by edges 51, faces forwardly and is located at the forwardmost portion of the vertical fin 50; two openings on the left and right sides of the dorsal fin 50 are located through the lateral surfaces of the dorsal fin 50 and of surface 49. The ram inlet 51 need not be provided with a closing means. Each lateral inlet 52 preferably includes a hinged flap door 53, hinged along its upper edge to the lateral surface of the tail and openable inwardly into the tail air channel 49.

Teeing out from the inlet duct 48 is a heater duct 54 connecting to an air heater.

Within the second straight section 147, immediately adjacent the condenser 42, is located an air impeller mechanism, such as an axial vane fan and electric fan motor, so placed as to draw air from the direction of the air channel 49 and toward the plenum chamber of the condenser 42.

Located within the first straight inlet duct section 47 is a conventional butterfly control valve, for closing off air flow through the duct thereby preventing the fan motor from rotating when the air conditioning system is not operating. The butterfly control valve is operated by remote control through the servomechanism 55 located on the exterior of the straight duct 47.

An exhaust air duct 56 is in fluid flow connection with the plenum chamber of the condenser 42, through the rear wall of the condenser 42.

In an alternative configuration, the side inlets 52 are not formed in the dorsal fin 50, and the conventional ram inlet 51 is connected only to the heater duct 54. The axial fan duct 147 is connected to a flush NACA-type ram inlet formed through the side of the fuselage, adjacent the condenser location. This does result in some additional drag.

In operation, the refrigerant compressor 12 is so placed as to be driven by the compressor pulley belt 32, powered indirectly from the main drive belt pulley 15. The indirect connection is through a second, inner sheave on the alternator pulley 26. This results in a far more compact drive system than having the compressor 12 driven directly by the main pulley. The tightness of the compressor pulley belt 32 and of the main drive pulley belt 30 is readily adjusted by varying the number of spacers between the pulley sheave halves 126 and 226.

Compressed refrigerant flows from the compressor 12 through the high pressure warm hose 40 into the condenser 42, where it flows through coiled tubing in indirect contact with cooling air in a plenum chamber surrounding the coiled tubing. The cool and condensed refrigerant then moves out through the high pressure cooled hose 43 to the dryer 44, where moisture is removed from the condensed refrigerant, and thence through the high pressure (dried) hose 45 to an expansion valve 62, where the refrigerant is permitted to expand into the evaporator within a plenum chamber containing air recirculated from the aircraft cabin for cooling.

In the preferred condenser cooling arrangement shown in FIG. 5, the coolant air for the plenum chamber in the condenser 42 is drawn in through the tail air channel 49. Air from the channel 49 passes through the convergent bent duct 48 and then through a first straight section 47 and thence through the 180° U-bend 46 to the axial vane fan assembly 147 and the condenser plenum 42. A butterfly control valve within the first straight section 47 is opened remotely when the air conditioning system is turned on. When the system is not on, the butterfly valve closes, shutting off air flow to the condenser and permitting air to flow to the heater inlet tube 54 to a conventional heater system for the aircraft.

When the air conditioner system is being utilized, the butterfly control valve in the first straight section 47 is maintained in the open position by the servomechanism 55, permitting air to flow from the tail channel 49 through the inlet duct 46 and into the condenser 42. When the airplane is in flight, air enters through the forward facing ram inlet 51 and into the tail air channel 49. For the in-flight condition, sufficient cooling air is supplied through the ram inlet 51; thus the electrically driven fan 147 can be turned off, conserving the aircraft's electrical power. When the aircraft is on the ground, however, and substantially stationary, the axial vane fan within the second straight duct 147, is activated drawing air through the inlet duct 46 and by so doing reducing the pressure within the channel 49 and creating a pressure drop across the lateral inlet 52, opening the flap door 53 and bringing air into the duct 48 through the lateral inlet 52. A similar fan is provided in the heater duct 54 when the butterfly control valve is moved to the closed position by the servomechanism 55.

The fan 147 either can be manually shut off or automatically shut off, e.g., upon retraction of the landing gear or by other means sensitive to the movement of the aircraft in flight. In this fashion, the air conditioner system can be operated while the aircraft is stationary, without increasing drag on the aircraft when airborne. During flight, the outside pressure against the lateral surfaces of the flap doors 53 drops below the pressure in the inlet channel 49, causing the flap doors 53 to be shut tightly against the lateral inlet edges 52. Sufficient coolant air reaches the condenser 42, entering the channel 49 through the ram inlet 51. Thus the lateral surface of the fin 50 is maintained substantially continuously smooth during flight while the air intake doors 53 can open when the aircraft is stationary. Preferably, the ram inlet 51 has a smaller open area than the lateral inlets 52.

Figure 1A:
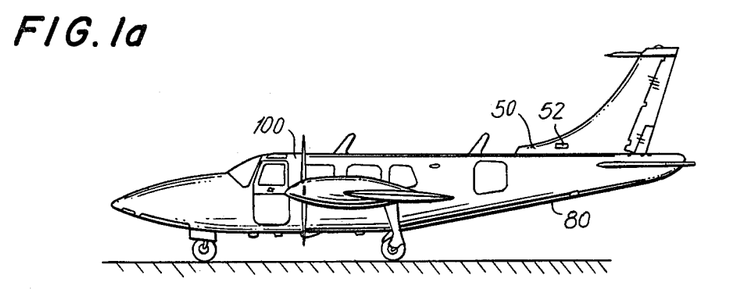
FIGS. 1(a) and (b) are two views of a Piper Aerostar aircraft incorporating the improvement of this invention.
Figure 1B:
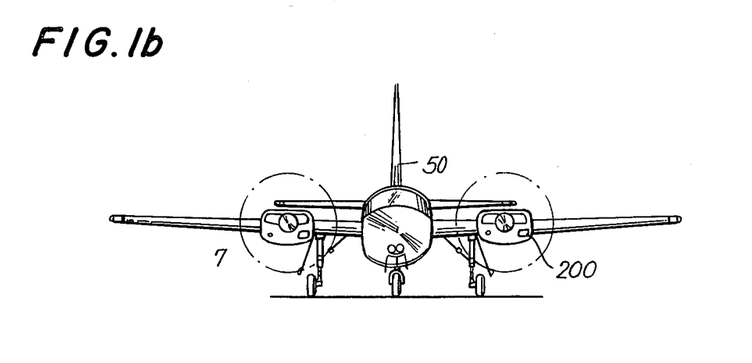
Figure 2:
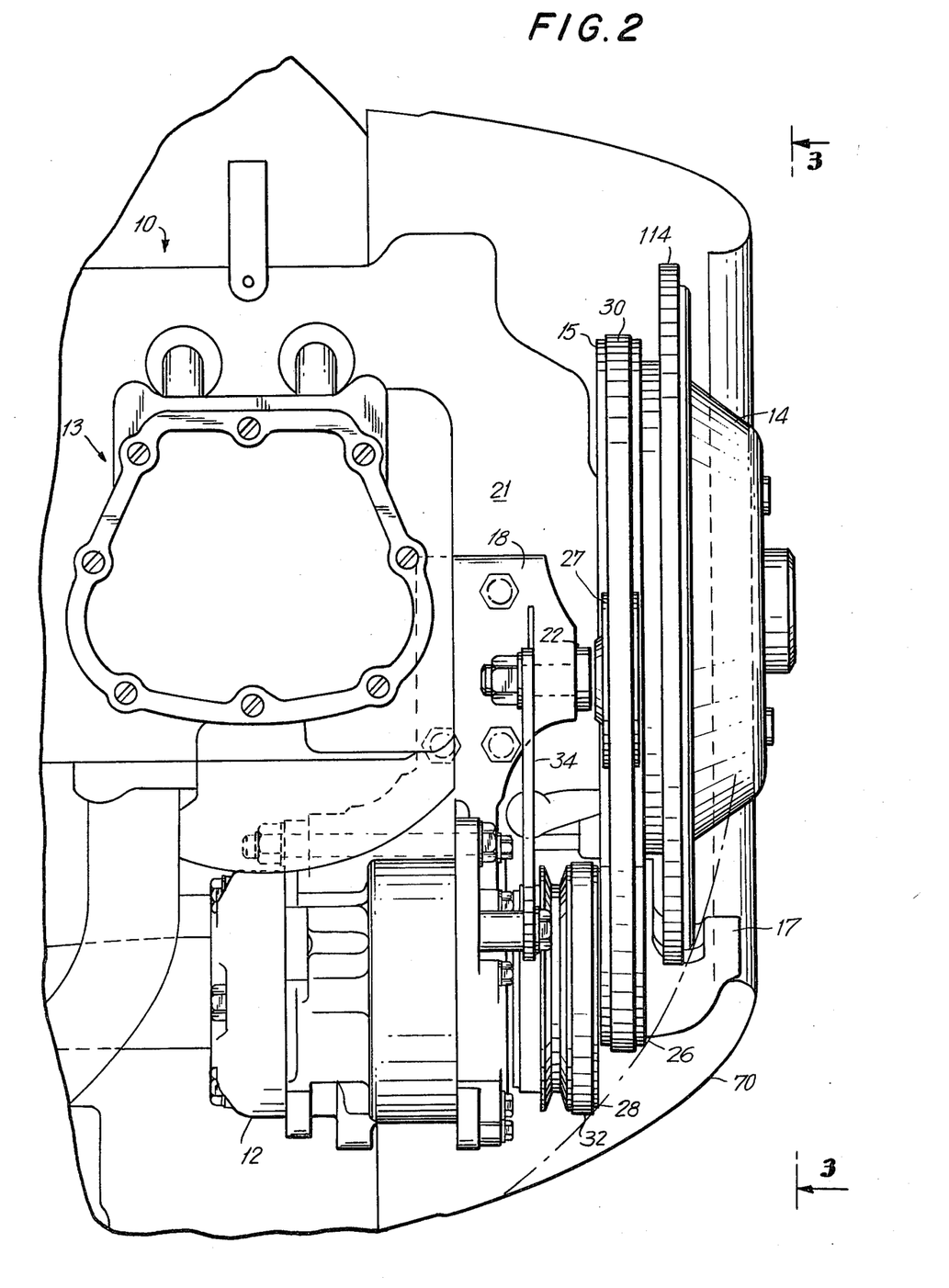
FIG. 2 is a partially cut-away side view of the right wing engine compartment of the Piper Aerostar aircraft incorporating the present invention.
Figure 3:
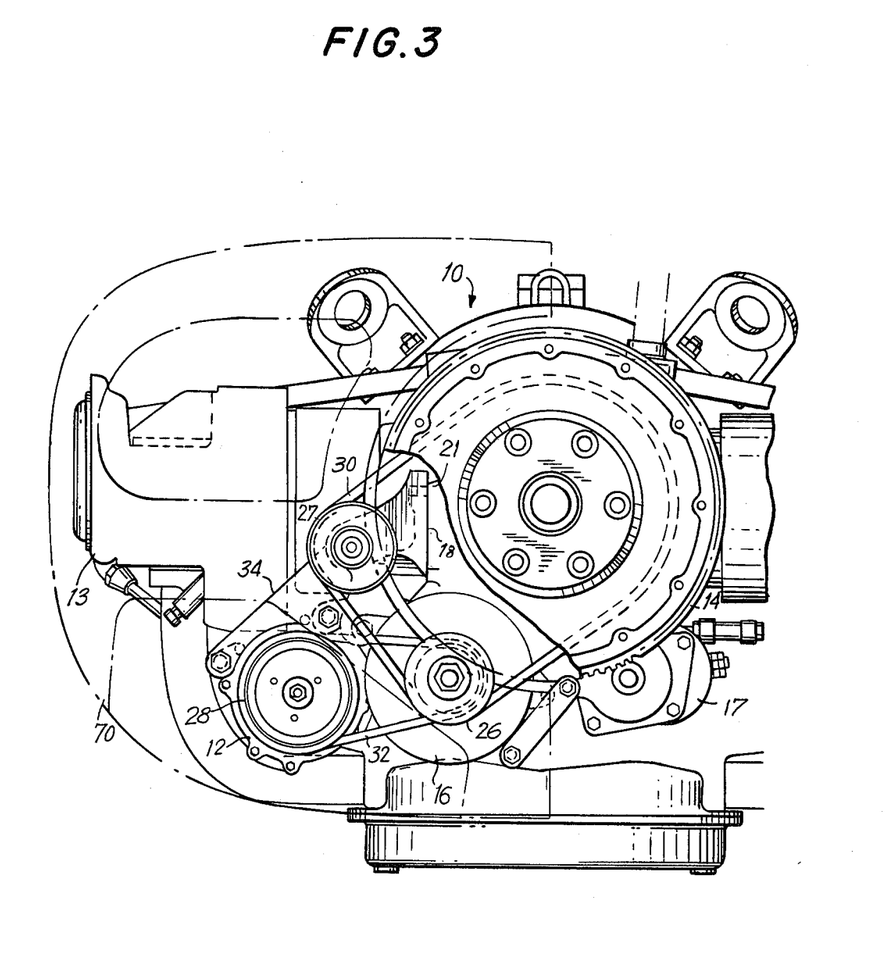
FIG. 3 is a front view of the right engine compartment taken along lines 3—3 of FIG. 2.

In the preferred embodiment shown, the frontal area of the engine compartment containing the compressor is substantially the same as the engine without the compressor. The frontal area of a nacelle 70 suitable for covering the compressor-engine combination of this invention is preferably no greater than the frontal area of a standard nacelle for an engine without a compressor. Referring to FIG. 2, the conventional nacelle is shown in phantom lines. Although the modified nacelle extends forwardly of the standard nacelle (70), there is no difference in frontal surface area.

This system can be applied to a conventional Piper Aerostar, or to any aircraft utilizing the Lycoming series engines.

The preferred bracket mount 18 is shown as an integral unit, as molded or machined. However, units having the same overall configuration but connected together by bolts or other connecting means can be used if desired.

The twin sheaved pulley can be located on the tightener pulley; however, it is preferred to have it on the alternator pulley as shown.

Figure 7:
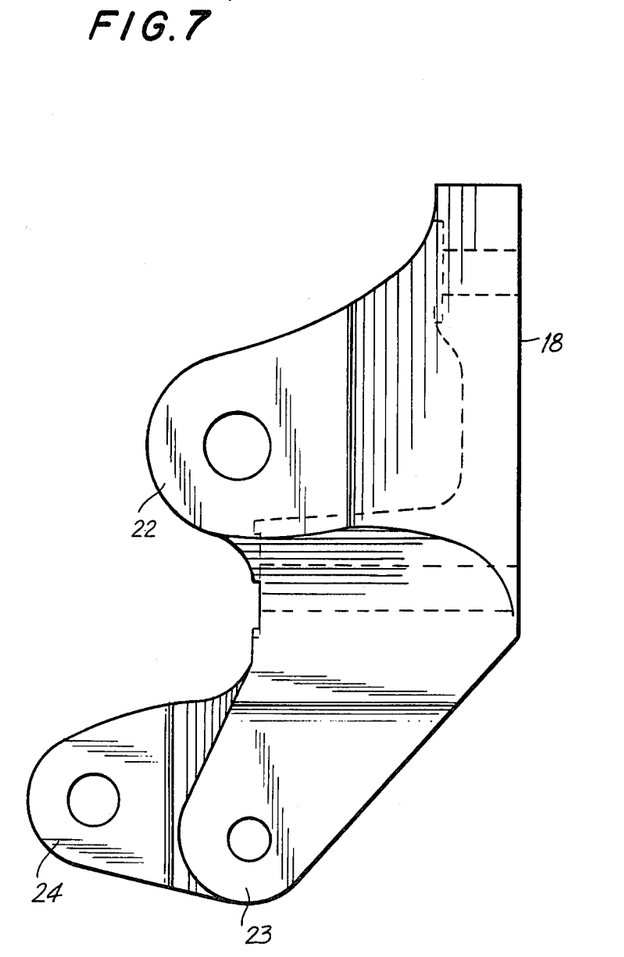
FIG. 7 is a front elevation view of a bracket mount.
Figure 8:
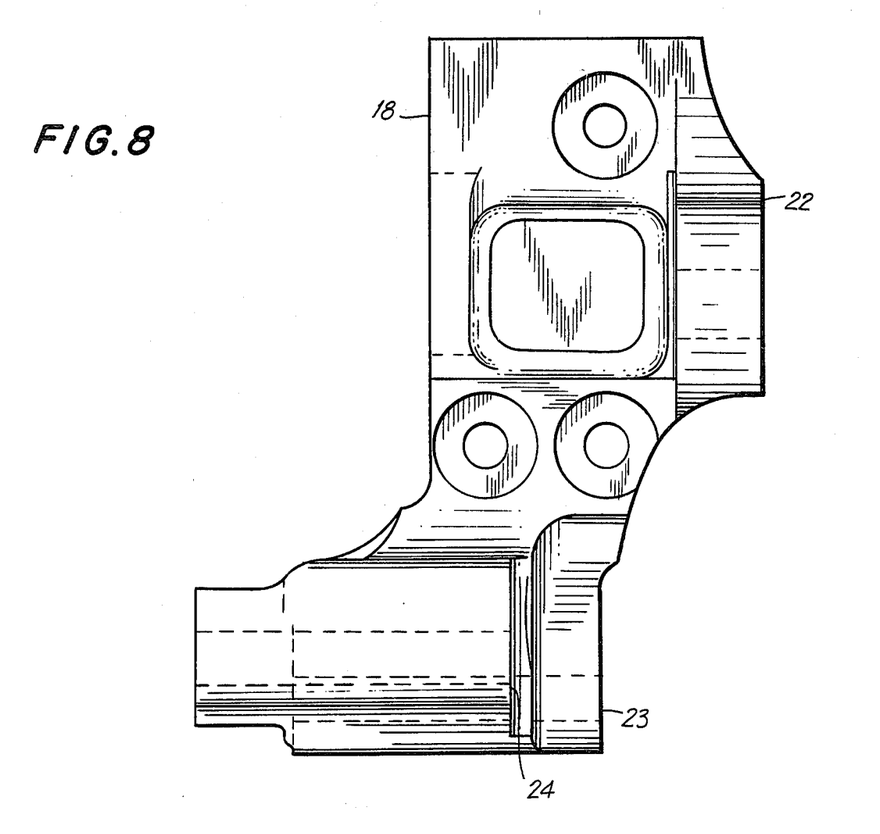
FIG. 8 is a side elevation view of the bracket mount.
Figure 9:
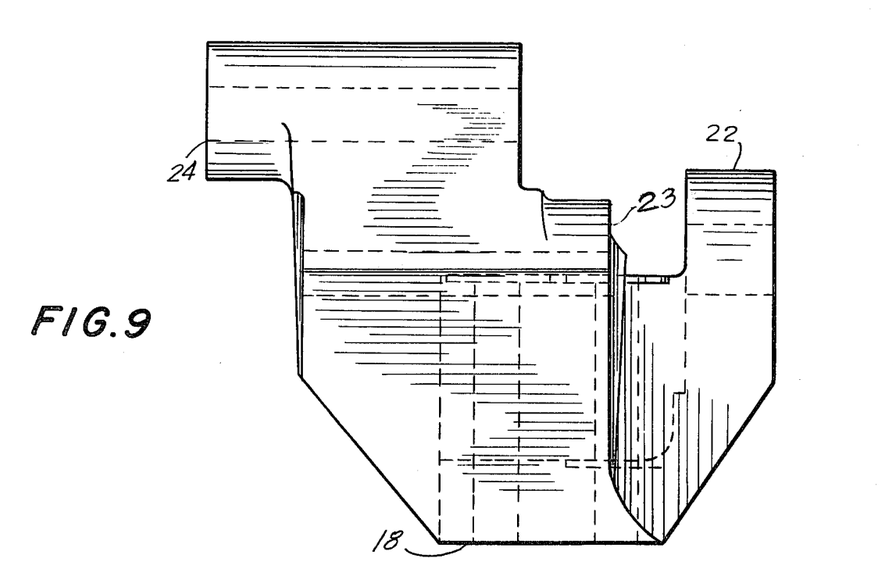
FIG. 9 is a bottom view of the bracket mount.

The alternator/compressor mounting bracket 18 shown in FIGS. 7, 8, and 9 is designed to position the alternator and compressor in the most compact arrangement practical with respect to the engine 10, without creating interference with other engine components or the cooling air flow characteristics of the engine.

This invention is readily applicable to other horizontally opposed aircraft engines having the same construction of the forward position, including the starter ring gear bulkhead. Such similar engines include the larger Lycoming engines, such as the 720 Series engine (8 cylinder), and the smaller Lycoming engines, such as the 360 Series engines (4 cylinders).

The compressor unit 12 can have a maximum diameter of about 5 inches and a maximum length of about 7 inches. The alternator unit 16 can have a maximum diameter of about 6 inches and a maximum length of about 8 inches.

It is possible to provide additional cowling clearance by attaching the compressor such that its axis is skewed to the axis of the alternator. This can be accomplished by forming the compressor bracket 24 such that its axis is slightly skewed from the axis of the alternator bracket 23, e.g., by an angle of between about 7° and 10°.

The patentable embodiments of this invention which are claimed are:

1. In an air conditioner system for powered aircraft having at least one engine within an aerodynamically defined engine compartment cowling, the engine compartment containing an engine being a horizontally opposed reciprocating engine having two opposed banks of cylinders (the banks of cylinders being longitudinally offset such that the right bank ends forwardly of the left bank of cylinders), a main starter ring, and driving means for a propeller located along the center axis of the engine immediately forwardly of the opposed banks of cylinders, and an electrical generating means located alongside the starter ring gear and forwardly of the right cylinder bank, and wherein the air conditioner system comprises a refrigerant compressor and means for powering the refrigerant compressor from the engine; the improvement wherein the electrical generating means and the compressor are generally elongated structures extending longitudinally along axes located laterally outwardly from the starter ring gear and forwardly of the right bank of cylinders, and both of the electrical generating means and the compressor being mechanically powered by the engine, the compressor and alternator being so placed that the total frontal surface area of the engine compartment cowling is not increased by the placement of the compressor in such location, and comprising bracket mounting means secured to a lateral surface of the engine, forwardly of the right bank of cylinders and rearwardly of the main starter ring gear, the bracket mounting means comprising a first bracket extending outwardly and downwardly from the lateral wall of the engine and located beneath the horizontally extending cylinders, and a second bracket extending laterally outwardly beyond the first bracket; the electrical generating means being secured to and supported by the first bracket and extending below the right cylinder bank, and the second bracket being secured to and supporting the refrigerant compressor adjacent the electrical generating means; a first belt-driven means operatively connected to the electrical generating means, first driving belt means operatively connected between the first belt-driven means and the starter ring gear such that the electrical generator means is mechanically powered by the engine; belt driving means operatively connected to the first belt-driven means; second belt-driven means operatively secured to the refrigerant compressor; and second driving belt means operatively connected between the second belt driven means and the belt driving means whereby the mechanical power from the engine is indirectly used to drive the refrigerant compressor.

2. The system of claim 1 wherein the second bracket is located above and rearwardly of the first bracket.

3. The system of claim 1 wherein the second belt-driven means is located immediately axially adjacent to the belt driving means, being concentrically secured thereto and to the electrical generating means such that as the first belt-driven means is caused to rotate the belt driving means rotates therewith.

4. The system of claim 3 wherein the second belt-driven means and the belt driving means comprise the two sheaves of a twin-sheave pulley.

5. The system of claim 1 comprising in addition a third bracket means secured to the bracket mounting means above and forward of the first and second brackets, and extending laterally outwardly from the lateral wall of the engine, a third belt-driven means rotatably secured to the third bracket wherein the first driving belt means drives the first and third belt-driven means such that the third belt driven means in combination with the first serves to permit tightening of the belt driving means by varying the space between the drive pulley sheave halves.

6. In an air conditioning system for powered aircraft comprising an enclosed cabin, an air cooler chamber, impeller means for passing air between the cabin and the air cooler chamber, and refrigerant means for providing pressurized refrigerant fluid to the air cooler chamber for indirect heat exchange with the air, the refrigerant means comprising a refrigerant compressor, compressed refrigerant cooling means and means for providing ambient air for indirect cooling of the compressed refrigerant, comprising air flow conduit means between the atmosphere and the compressed refrigerant cooling means, an inlet between the air flow conduit and the atmosphere, and movable closure means for the inlet when the pressure within the air flow conduit is below atmospheric pressure; and impeller means for reducing air pressure within the air flow conduit adjacent the inlet, including opening of the closure means.

7. The system of claim 6 comprising switch means for shutting off the impeller means when the aircraft is airborne.

8. The system of claim 7 comprising a second, forward facing inlet connecting the air flow conduit to the atmosphere such that air is rammed into the conduit when the aircraft is airborne, and wherein the first inlet is facing laterally of the aircraft.

9. The system of claim 8 wherein the closure means for the first inlet is biased so as to be open only when the pressure within the air flow conduit is below ambient pressure.

10. The system of claim 9 wherein the closure means for the first inlet comprises a flap means hingedly connected to the aircraft at the top of the flap and so connected to the aircraft as to pivot inwardly to open the inlet when the pressure within the air flow conduit is below ambient pressure.

11. The system of claim 10 comprising in addition a heater duct air flow channel in fluid flow connection with the first flow channel and means to close off the first flow channel to permit air flow to the heater duct when the air conditioning system is not in operation.

12. The system of claim 8 comprising a means to close off the flow to the impeller to prevent continual rotation and wear of the impeller motor when the air conditioning system is not in operation.

13. The system of claim 1 wherein the engine is one of a Lycoming Series 360, 540 and 720 Model engine.

* * * * *